United States Patent
Katayama et al.

(10) Patent No.: US 11,438,890 B2
(45) Date of Patent: Sep. 6, 2022

(54) WIRELESS COMMUNICATION METHOD, WIRELESS COMMUNICATION DEVICE AND WIRELESS COMMUNICATION SYSTEM FOR SLOT ALLOCATION (71) Applicant: NIPPON TELEGRAPH AND TELEPHONE CORPORATION, Tokyo (JP)

(72) Inventors: Yohei Katayama, Musashino (JP); Atsushi Taniguchi, Musashino (JP); Kenji Shimizu, Musashino (JP); Takahiro Yamazaki, Musashino (JP); Maiko Naya, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 62 days.

(21) Appl. No.: 17/047,727

(22) PCT Filed: Apr. 8, 2019

(86) PCT No.: PCT/JP2019/015280
§ 371 (c)(1),
(2) Date: Oct. 15, 2020

(87) PCT Pub. No.: WO2019/203039
PCT Pub. Date: Oct. 24, 2019

(65) Prior Publication Data
US 2021/0112549 A1    Apr. 15, 2021

(30) Foreign Application Priority Data
Apr. 16, 2018 (JP) .............................. JP2018-078725

(51) Int. Cl.
H04W 72/04    (2009.01)
H04W 76/15    (2018.01)
(Continued)

(52) U.S. Cl.
CPC ......... *H04W 72/0446* (2013.01); *H04L 69/18* (2013.01); *H04L 69/22* (2013.01);
(Continued)

(58) Field of Classification Search
CPC .. H04L 1/0027; H04L 12/4015; H04W 72/12; H04W 72/0446; H04N 21/4332; H04N 21/4532
See application file for complete search history.

(56) References Cited

U.S. PATENT DOCUMENTS

2006/0013168 A1    1/2006   Agrawal et al.
2006/0018279 A1*   1/2006   Agrawal ............... H04B 7/2656
                                                    370/330
(Continued)

FOREIGN PATENT DOCUMENTS

JP    2013126010 A    6/2013
JP    2015156680 A    8/2015

OTHER PUBLICATIONS

Hideaki, Kanno et al. "Software Defined Radio." Oki Technical Review. Oct. 2005, pp. 80-85.

*Primary Examiner* — Salvador E Rivas (57) ABSTRACT

A wireless communication method is executed by a wireless communication system including one or more wireless terminals and a wireless communication apparatus. The wireless communication apparatus generates wireless scheme schedule information, which is information related to a schedule of a slot allocated to an uplink signal and a downlink signal of a predetermined wireless scheme, generates a downlink signal to be transmitted in the slot to the wireless terminal based on the wireless scheme schedule information, and transmits a beacon signal including the wireless scheme schedule information in the slot. The wireless terminal receives the beacon signal, in the slot, acquires the wireless scheme schedule information from the beacon (Continued)

| VARIABLES | | VALUES |
|---|---|---|
| SCHEDULE INFORMATION | TIME SLOT CYCLE | 3 (SLOTS) |
| | TIME SLOT AVAILABLE FOR COMMUNICATION | SECOND SLOT |
| CURRENT TIME SLOT | | SECOND SLOT |
| ... | | ... | signal, and generates an uplink signal to be transmitted in the slot to the wireless communication apparatus, based on the wireless scheme schedule information.

7 Claims, 6 Drawing Sheets

(51) Int. Cl.
*H04W 36/30* (2009.01)
*H04L 69/18* (2022.01)
*H04L 69/22* (2022.01)
*H04N 21/433* (2011.01)
*H04N 21/45* (2011.01)

(52) U.S. Cl.
CPC ......... *H04W 36/305* (2018.08); *H04W 76/15* (2018.02); *H04N 21/4332* (2013.01); *H04N 21/4532* (2013.01)

(56) References Cited

U.S. PATENT DOCUMENTS

| | | | |
|---|---|---|---|
| 2008/0205327 A1* | 8/2008 | Tu | H04W 52/0216 370/328 |
| 2009/0228891 A1* | 9/2009 | Tao | H04W 72/042 718/104 |
| 2018/0279325 A1* | 9/2018 | Huang | H04L 43/0858 |

* cited by examiner

Fig. 1

| VARIABLES | | VALUES |
|---|---|---|
| TIME SLOT CYCLE | | 3 (SLOTS) |
| ALLOCATION | FIRST SLOT | SECOND WIRELESS SCHEME |
| | SECOND SLOT | FIRST WIRELESS SCHEME |
| | THIRD SLOT | THIRD WIRELESS SCHEME |

Fig. 2

| VARIABLES | | VALUES |
|---|---|---|
| SCHEDULE INFORMATION | TIME SLOT CYCLE | 3 (SLOTS) |
| | TIME SLOT AVAILABLE FOR COMMUNICATION | SECOND SLOT |
| CURRENT TIME SLOT | | SECOND SLOT |
| ... | | ... |

WIRELESS COMMUNICATION METHOD, WIRELESS COMMUNICATION DEVICE AND WIRELESS COMMUNICATION SYSTEM FOR SLOT ALLOCATION

CROSS-REFERENCE TO RELATED APPLICATIONS

This application is a 371 U.S. National Phase of International Application No. PCT/JP2019/015280, filed on Apr. 8, 2019, which claims priority to Japanese Application No. 2018-078725 filed on Apr. 16, 2018. The entire disclosures of the above applications are incorporated herein by reference.

TECHNICAL FIELD

The present invention relates to a wireless communication method, a wireless communication apparatus, and a wireless communication system.

BACKGROUND ART

There is a wireless communication system including a wireless signal processing apparatus that is an apparatus that executes wireless signal processing, a wireless communication apparatus that includes a base station apparatus, and wireless terminals such as Internet of Things (IoT) devices having a wide variety of requirements. Each wireless terminal communicates with the wireless communication apparatus in a wireless scheme suitable for the requirements of the terminal itself. At least one among the wireless signal processing apparatus and the wireless communication apparatus executes wireless signal processing by software (see Non-Patent Literature 1).

The wireless communication apparatus determines whether software compatible with the wireless scheme of the wireless terminal has been downloaded to the wireless communication apparatus. If the software has been downloaded to the wireless communication apparatus, the wireless communication apparatus executes wireless signal processing. If the software has not been downloaded to the wireless communication apparatus, the wireless signal processing apparatus executes wireless signal processing instead of the wireless communication apparatus.

As described above, the wireless communication apparatus autonomously selects an apparatus that executes wireless signal processing among the wireless signal processing apparatus and the wireless communication apparatus according to a required delay. The wireless communication system can flexibly change the wireless scheme by exchanging software between the selected base station apparatus and the wireless signal processing apparatus.

CITATION LIST

Non Patent Literature

Non-Patent Literature 1: Hideaki Sugano, Hideaki Odagiri, Kenji Takaro, "Software Defined Radio", Oki Technical Review, No. 204, Vol. 72 No. 4, October 2005.

SUMMARY OF THE INVENTION

Technical Problem

Figure 7:
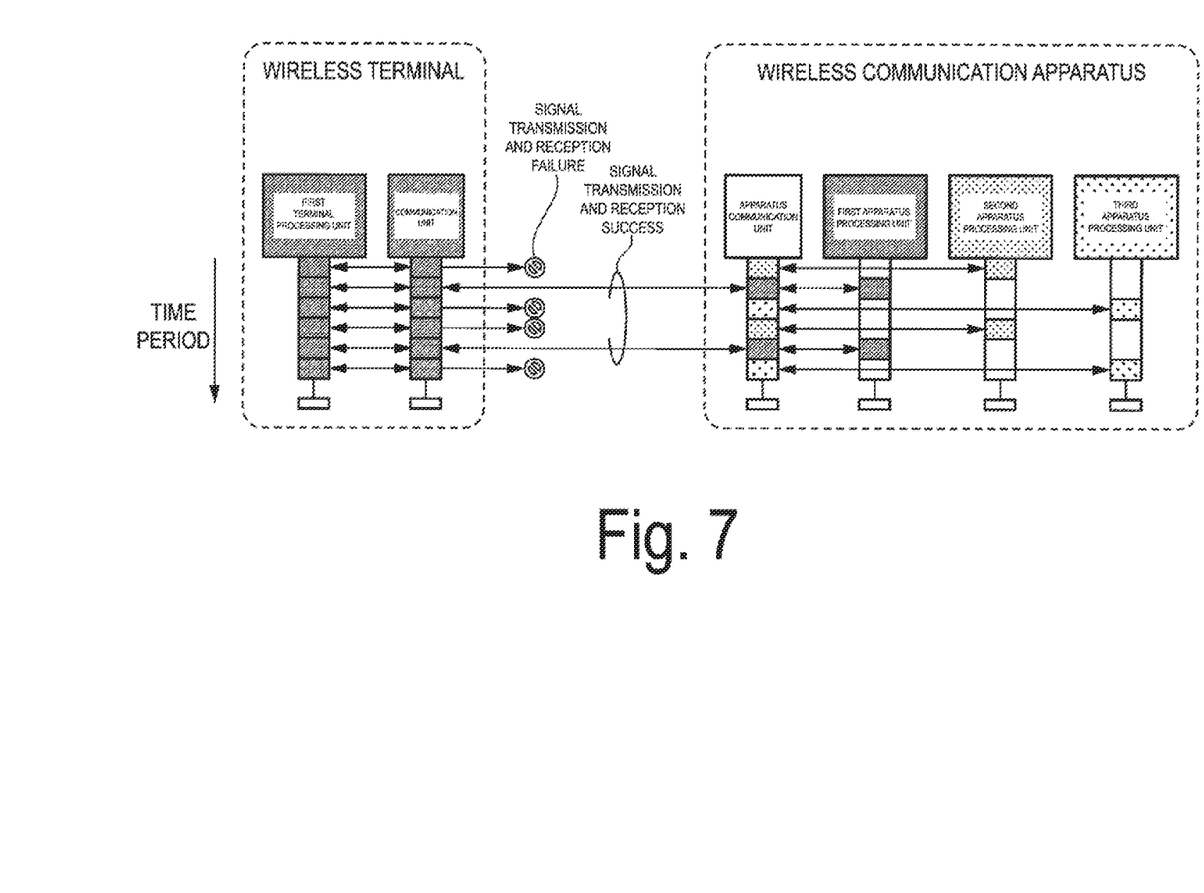
FIG. 7 is a flowchart illustrating an example of operations of a wireless communication system of the related art.

FIG. 7 is a flowchart illustrating an example of operations of a wireless communication system of the related art. In FIG. 7, the wireless communication system includes a wireless communication apparatus and a wireless terminal. The wireless communication apparatus includes a first apparatus processing unit, a second apparatus processing unit, a third apparatus processing unit, and an apparatus communication unit as a base station apparatus. The first apparatus processing unit executes signal processing of a first wireless scheme. The second apparatus processing unit executes signal processing of a second wireless scheme. The third apparatus processing unit executes signal processing of a third wireless scheme. The apparatus communication unit communicates a wireless signal between its own apparatus and the wireless terminal. The wireless terminal includes a terminal communication unit and a first terminal processing unit. The terminal communication unit communicates a wireless signal between its own terminal and the wireless communication apparatus. The first terminal processing unit executes signal processing of a first wireless scheme.

The wireless terminal of the related art attempts to communicate with a wireless communication apparatus even if a slot (time slot) is allocated to a signal other than the wireless scheme of the terminal itself. In FIG. 7, since the first terminal processing unit cannot communicate with the wireless communication apparatus in a slot allocated to a signal of a wireless scheme other than the first wireless scheme, signal retransmission processing and reception standby processing occur. As described above, the wireless communication apparatus of the related art may not be able to reduce unnecessary wireless communication.

In view of the above circumstances, an object of the present invention is to provide a wireless communication method, a wireless communication apparatus, and a wireless communication system that can reduce unnecessary wireless communication.

Means for Solving the Problem

One aspect of the invention is a wireless communication method executed by a wireless communication system including one or more wireless terminals and a wireless communication apparatus, the method including, at the wireless communication apparatus, generating wireless scheme schedule information, which is information related to a schedule of a slot allocated to an uplink signal and a downlink signal of a predetermined wireless scheme, generating the downlink signal transmitted in the slot to the wireless terminal, based on the wireless scheme schedule information, and transmitting, in the slot, a beacon signal including the wireless scheme schedule information, and at the wireless terminal, receiving the beacon signal, in the slot, and acquiring the wireless scheme schedule information from the beacon signal, and generating the uplink signal transmitted in the slot to the wireless communication apparatus, based on the wireless scheme schedule information.

One aspect of the invention is a wireless communication method executed by a wireless communication system including one or more wireless terminals and a wireless communication apparatus, the method including, at the wireless communication apparatus, generating first wireless scheme schedule information, which is information related to a schedule of a first slot allocated to an uplink signal and a downlink signal of a first wireless scheme, and second wireless scheme schedule information, which is information related to a schedule of a second slot allocated to an uplink signal and a downlink signal of the second wireless scheme, generating a downlink signal of the first wireless scheme transmitted in the first slot to the wireless terminal, based on the first wireless scheme schedule information, generating a downlink signal of the second wireless scheme transmitted in the second slot to the wireless terminal, based on the second wireless scheme schedule information, and transmitting, in the first slot, a beacon signal including the first wireless scheme schedule information and the second wireless scheme schedule information, and at the wireless terminal, receiving the beacon signal, in the first slot, and acquiring the first wireless scheme schedule information and the second wireless scheme schedule information from the beacon signal, generating an uplink signal of the first wireless scheme transmitted in the first slot to the wireless communication apparatus, based on the first wireless scheme schedule information, and generating an uplink signal of the second wireless scheme transmitted in the second slot to the wireless communication apparatus, based on the second wireless scheme schedule information.

One aspect of the present invention is the above-described wireless communication method, wherein when a second apparatus processing unit that generates the downlink signal of the second wireless scheme is not activated, the wireless communication apparatus activates the second apparatus processing unit and notifies the second apparatus processing unit of the second wireless scheme schedule information.

One aspect of the present invention is the above-described wireless communication method, wherein when generating an uplink signal of the second wireless scheme, the wireless terminal stops processing for generating an uplink signal of the first wireless scheme.

One aspect of the present invention is a wireless communication apparatus including an apparatus control unit that generates wireless scheme schedule information, which is information related to a schedule of a slot allocated to an uplink signal and a downlink signal of a predetermined wireless scheme, a first apparatus processing unit that generates the downlink signal transmitted in the slot to a wireless terminal, based on the wireless scheme schedule information, and an apparatus communication unit that transmits, in the slot, a beacon signal including the wireless scheme schedule information.

One aspect of the present invention is a wireless communication apparatus including an apparatus control unit that generates first wireless scheme schedule information, which is information related to a schedule of a first slot allocated to an uplink signal and a downlink signal of a first wireless scheme, and second wireless scheme schedule information, which is information related to a schedule of a second slot allocated to an uplink signal and a downlink signal of the second wireless scheme, a first apparatus processing unit that generates a downlink signal of the first wireless scheme transmitted in the first slot to the wireless terminal, based on the first wireless scheme schedule information, a second apparatus processing unit that generates a downlink signal of the second wireless scheme transmitted in the second slot to the wireless terminal, based on the second wireless scheme schedule information, and an apparatus communication unit that transmits, in the first slot, a beacon signal including the first wireless scheme schedule information and the second wireless scheme schedule information.

One aspect of the present invention is a wireless communication system including one or more wireless terminals and a wireless communication apparatus, in which the wireless communication apparatus includes an apparatus control unit that generates wireless scheme schedule information, which is information related to a schedule of a slot allocated to an uplink signal and a downlink signal of a predetermined wireless scheme, a first apparatus processing unit that generates the downlink signal transmitted in the slot to the wireless terminal, based on the wireless scheme schedule information, and an apparatus communication unit that transmits, in the slot, a beacon signal including the wireless scheme schedule information, and the wireless terminal includes a terminal communication unit that receives the beacon signal, in the slot, and acquires the wireless scheme schedule information from the beacon signal, and a first terminal processing unit that generates the uplink signal transmitted in the slot to the wireless communication apparatus, based on the wireless scheme schedule information.

One aspect of the present invention is a wireless communication system including one or more wireless terminals and a wireless communication apparatus, in which the wireless communication apparatus includes an apparatus control unit that generates first wireless scheme schedule information, which is information related to a schedule of a first slot allocated to an uplink signal and a downlink signal of a first wireless scheme, and second wireless scheme schedule information, which is information related to a schedule of a second slot allocated to an uplink signal and a downlink signal of the second wireless scheme, a first apparatus processing unit that generates a downlink signal of the first wireless scheme transmitted in the first slot to the wireless terminal, based on the first wireless scheme schedule information, a second apparatus processing unit that generates a downlink signal of the second wireless scheme transmitted in the second slot to the wireless terminal, based on the second wireless scheme schedule information, and an apparatus communication unit that transmits, in the first slot, a beacon signal including the first wireless scheme schedule information and the second wireless scheme schedule information, and the wireless terminal includes a terminal communication unit that receives the beacon signal, in the first slot, and acquires the first wireless scheme schedule information and the second wireless scheme schedule information from the beacon signal, a first terminal processing unit that generates an uplink signal of the first wireless scheme transmitted in the first slot to the wireless communication apparatus, based on the first wireless scheme schedule information, and a second terminal processing unit that generates an uplink signal of the second wireless scheme transmitted in the second slot to the wireless communication apparatus, based on the second wireless scheme schedule information.

One aspect of the present invention is the above-described wireless communication system, in which the wireless communication apparatus further includes an apparatus control unit that activates the second apparatus processing unit, when the second apparatus processing unit is not activated, and notifies the second apparatus processing unit of the second wireless scheme schedule information.

One aspect of the present invention is the above-described wireless communication system, in which when generating an uplink signal of the second wireless scheme, the first terminal processing unit stops processing of generating an uplink signal of the first wireless scheme.

Effects of the Invention

According to the present invention, it is possible to reduce unnecessary wireless communication.

DESCRIPTION OF EMBODIMENTS

Embodiments of the present invention will be described in detail with reference to drawings.

First Embodiment

Figure 1:
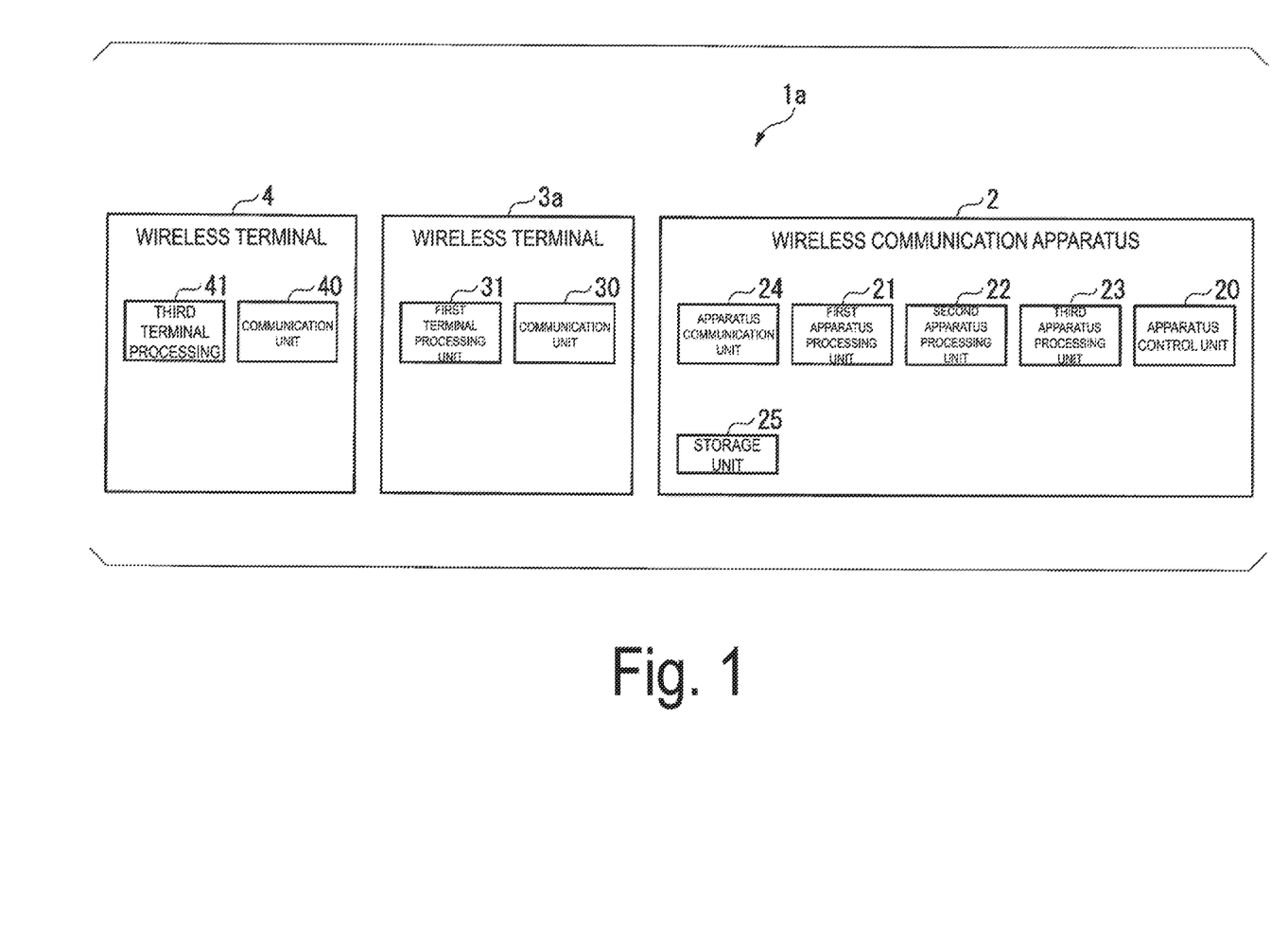
FIG. 1 is a diagram illustrating an example of a configuration of a wireless communication system according to a first embodiment.

FIG. 1 is a diagram illustrating an example of a configuration of a wireless communication system 1a. The wireless communication system 1a includes a wireless communication apparatus 2, one or more wireless terminals 3a, and one or more wireless terminals 4. The wireless communication system 1a is a system that executes communication of a plurality of wireless schemes. Hereinafter, the direction of communication from a wireless terminal to a wireless communication apparatus is referred to as "uplink". Hereinafter, the direction of communication from a wireless communication apparatus to a wireless terminal is referred to as "downlink".

The wireless communication apparatus 2 is an apparatus that executes communication of a plurality of wireless schemes, and is, for example, a base station apparatus. The base station apparatus communicates with a wireless terminal of each wireless scheme by switching a plurality of wireless schemes such as the 802.11 standard. The base station apparatus is, for example, an access point corresponding to software defined radio (SDR). The wireless scheme supported by the wireless communication apparatus 2 is, for example, a wireless scheme required by a plurality of service providers that provide wireless communication services.

The wireless terminal 3a is a terminal that executes wireless communication with the wireless communication apparatus 2 by using one type of wireless scheme among a plurality of wireless schemes supported by the wireless communication apparatus 2. The wireless terminal 4 is a terminal that executes wireless communication with the wireless communication apparatus 2 by using one type of wireless scheme other than the wireless scheme of the wireless terminal 3a. The wireless terminal 3a and the wireless terminal 4 are, for example, a smartphone terminal, a tablet terminal, and an IoT device.

Next, the configuration of the wireless communication apparatus 2 will be described. The wireless communication apparatus 2 includes an apparatus control unit 20, a first apparatus processing unit 21, a second apparatus processing unit 22, a third apparatus processing unit 23, an apparatus communication unit 24, and a storage unit 25. Hereinafter, items common to the first apparatus processing unit 21, the second apparatus processing unit 22, and the third apparatus processing unit 23 are referred to as "apparatus processing units" by omitting reference numerals and the like. The wireless communication apparatus 2 may further include an apparatus processing unit. The apparatus control unit 20 and the apparatus processing unit may be provided inside the wireless communication apparatus 2 or may be provided outside the wireless communication apparatus 2 via a network.

The apparatus control unit 20 is an information processing apparatus (integrated controller) that controls the operation of each apparatus processing unit. The apparatus control unit 20 includes a non-volatile storage apparatus (non-temporary recording medium) such as a flash memory. This non-volatile storage apparatus stores, for example, a software program. The apparatus control unit 20 may further include a volatile recording medium such as a random access memory (RAM). The volatile storage apparatus stores, for example, a table of information related to wireless communication schedules (hereinafter, referred to as a "schedule information table").

Figure 2:
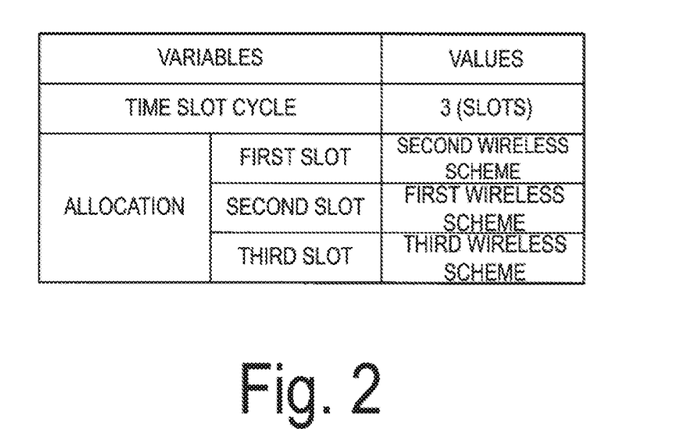
FIG. 2 is a diagram illustrating an example of a schedule information table according to the first embodiment.

FIG. 2 is a diagram illustrating an example of the schedule information table (time table). The schedule information table includes information indicating a cycle (hereinafter, referred to as "time slot cycle") in which a signal of the same wireless scheme is allocated to a slot, and information (identification number of an apparatus processing unit for each wireless scheme) indicating a wireless scheme of a signal allocated to a slot. The time slot cycle is expressed in slot units. Signals of different wireless schemes are allocated to different slots.

When the types of wireless schemes used in the wireless communication system 1a are, for example, three, the time slot cycle is, for example, 3. The slot allocation illustrated in FIG. 2 is an example.

The apparatus control unit 20 generates information (hereinafter, referred to as "first wireless scheme schedule information") related to a schedule of a slot allocated to an uplink signal and a downlink signal of a first wireless scheme. In FIG. 2, the first wireless scheme schedule information indicates that the slot (time slot available for communication) allocated to the uplink signal and the downlink signal of the first wireless scheme is a second slot. The apparatus control unit 20 notifies the first apparatus processing unit 21 of the first wireless scheme schedule information.

The apparatus control unit 20 generates information (hereinafter, referred to as "second wireless scheme schedule information") related to a schedule of a slot allocated to an uplink signal and a downlink signal of a second wireless scheme. In FIG. 2, the second wireless scheme schedule information indicates that the slot allocated to the uplink signal and the downlink signal of the second wireless scheme is a first slot. The apparatus control unit 20 notifies the second apparatus processing unit 22 of the second wireless scheme schedule information.

The apparatus control unit 20 generates information (hereinafter, referred to as "third wireless scheme schedule information") related to a schedule of a slot allocated to an uplink signal and a downlink signal of a third wireless scheme. In FIG. 2, the third wireless scheme schedule information indicates that the slot allocated to the uplink signal and the downlink signal of the third wireless scheme is a third slot. The apparatus control unit 20 notifies the third apparatus processing unit 23 of the third wireless scheme schedule information.

The first apparatus processing unit 21 is a processing unit that executes signal processing of the first wireless scheme. The first apparatus processing unit 21 stores a table of information indicating a state related to the first wireless scheme (hereinafter, referred to as a "state information table of the first wireless scheme").

Figure 3:
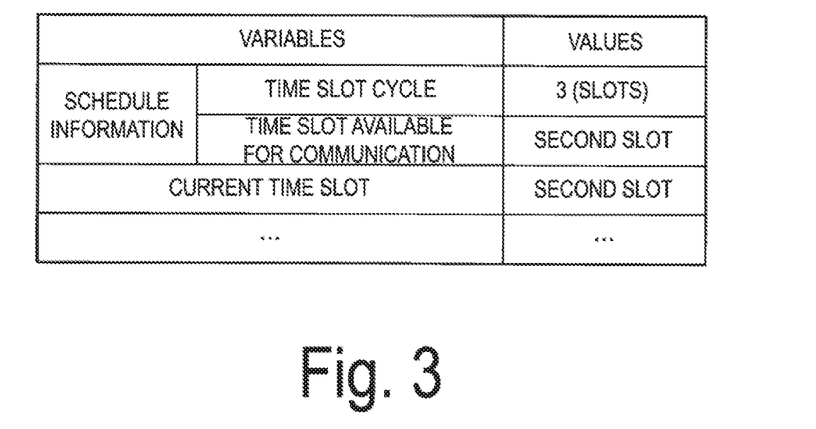
FIG. 3 is a diagram illustrating an example of a state information table according to the first embodiment.

FIG. 3 is a diagram illustrating an example of the state information table. The state information table of each wireless scheme may be collectively stored in the storage unit 25. The status information table of the first wireless scheme includes the first wireless scheme schedule information (information indicating a time slot cycle, information indicating a time slot available for communication) and information indicating a current slot.

The first apparatus processing unit 21 records the first wireless scheme schedule information in the state information table of the first wireless scheme. The first apparatus processing unit 21 updates the information indicating the current slot in the state information table of the first wireless scheme according to a current time.

The first apparatus processing unit 21 outputs the first wireless scheme schedule information to the apparatus communication unit 24 in the second slot allocated to a signal of the first wireless scheme in the schedule information table. The first apparatus processing unit 21 communicates with the wireless terminal 3a via the apparatus communication unit 24 by using the signal of the first wireless scheme allocated to the second slot.

The second apparatus processing unit 22 is a processing unit that executes signal processing of the second wireless scheme. The second apparatus processing unit 22 stores an information table indicating a state related to the second wireless scheme (hereinafter, referred to as a "state information table of the second wireless scheme"). The second apparatus processing unit 22 records the second wireless scheme schedule information in the state information table of the second wireless scheme. The second apparatus processing unit 22 updates information indicating the current slot in the second wireless scheme schedule information according to the current time.

The second apparatus processing unit 22 outputs the second wireless scheme schedule information to the apparatus communication unit 24 in the first slot allocated to a signal of the second wireless scheme in the schedule information table. The second apparatus processing unit 22 communicates with a wireless terminal (not illustrated) via the apparatus communication unit 24 by using the signal of the second wireless scheme allocated to the first slot.

The third apparatus processing unit 23 is a processing unit that executes signal processing of the third wireless scheme. The third apparatus processing unit 23 stores an information table indicating a state related to the third wireless scheme (hereinafter, referred to as a "state information table of the third wireless scheme"). The third apparatus processing unit 23 records the third wireless scheme schedule information in the state information table of the third wireless scheme. The third apparatus processing unit 23 updates information indicating the current slot in the third wireless scheme schedule information according to the current time.

The third apparatus processing unit 23 outputs the third wireless scheme schedule information to the apparatus communication unit 24 in the third slot allocated to a signal of the third wireless scheme in the schedule information table. The third apparatus processing unit 23 communicates with the wireless terminal 4 via the apparatus communication unit 24 by using the signal of the third wireless scheme allocated to the third slot.

The apparatus communication unit 24 executes wireless signal processing for each wireless scheme. The apparatus communication unit 24 generates a wireless signal transmitted from the wireless communication apparatus 2 by executing modulation processing for each wireless scheme. The apparatus communication unit 24 generates a beacon signal including the first wireless scheme schedule information acquired from the first apparatus processing unit 21. The apparatus communication unit 24 generates a beacon signal including the second wireless scheme schedule information acquired from the second apparatus processing unit 22. The apparatus communication unit 24 generates a beacon signal including the third wireless scheme schedule information acquired from the third apparatus processing unit 23.

The apparatus communication unit 24 transmits a wireless signal (downlink signal), such as a beacon signal and the like, in a slot allocated to a signal for each wireless scheme. The apparatus communication unit 24 generates, for each wireless scheme, a baseband signal according to the received wireless signal by executing demodulation processing for each wireless scheme.

The apparatus communication unit 24 communicates with a wireless terminal (not illustrated) by using a signal of the second wireless scheme allocated to the first slot. The apparatus communication unit 24 communicates with the wireless terminal 3a by using the signal of the first wireless scheme allocated to the second slot. The apparatus communication unit 24 communicates with the wireless terminal 4 by using the signal of the third wireless scheme allocated to the third slot.

The storage unit 25 is a volatile recording medium such as a RAM. The storage unit 25 stores, for example, a state information table of each wireless scheme.

Next, the configuration of the wireless terminal 3a will be described.

The wireless terminal 3a includes a terminal communication unit 30 and a first terminal processing unit 31. The terminal communication unit 30 generates an electric signal, such as a baseband signal and the like, according to the wireless signal received in the second slot by executing the demodulation processing of the first wireless scheme. The terminal communication unit 30 receives a beacon signal from the apparatus communication unit 24. The terminal communication unit 30 acquires the first wireless scheme schedule information from the received beacon signal. The terminal communication unit 30 outputs the first wireless scheme schedule information to the first terminal processing unit 31.

The terminal communication unit 30 acquires data transmitted from the wireless terminal 3a in the second slot from the first terminal processing unit 31. The terminal communication unit 40 generates a wireless signal transmitted from the wireless terminal 3a by executing modulation processing of the first wireless scheme on data transmitted in the second slot. The terminal communication unit 30 transmits, in the second slot, a wireless signal (uplink signal) transmitted from the wireless terminal 3a.

The first terminal processing unit 31 is a processing unit that executes wireless signal processing of the first wireless scheme. The first terminal processing unit 31 acquires the first wireless scheme schedule information in the second slot allocated to the signal of the first wireless scheme in the schedule information table. The first terminal processing unit 31 outputs data transmitted from the wireless terminal 3a to the terminal communication unit 30 in the second slot allocated to the signal of the first wireless scheme in the first wireless scheme schedule information.

Next, the configuration of the wireless terminal 4 will be described.

The wireless terminal 4 is a terminal such as an IoT device that executes wireless communication of the third wireless scheme.

The wireless terminal 4 includes a terminal communication unit 40 and a third terminal processing unit 41.

The terminal communication unit 40 generates an electric signal, such as a baseband signal and the like, according to the wireless signal received in the third slot by executing the demodulation processing of the third wireless scheme. The terminal communication unit 40 receives a beacon signal from the apparatus communication unit 24. The terminal communication unit 40 acquires the third wireless scheme schedule information from the received beacon signal. The terminal communication unit 40 outputs the third wireless scheme schedule information to the third terminal processing unit 41.

The terminal communication unit 40 acquires data transmitted from the wireless terminal 4 in the third slot from the third terminal processing unit 41. The terminal communication unit 40 generates a wireless signal transmitted from the wireless terminal 4 by performing third wireless modulation processing on data transmitted in the third slot. The terminal communication unit 40 transmits, in the third slot, a wireless signal (uplink signal) transmitted from the wireless terminal 4.

The third terminal processing unit 41 is a processing unit that executes wireless signal processing of the third wireless scheme. The third terminal processing unit 41 acquires the third wireless scheme schedule information in the third slot allocated to the signal of the third wireless scheme in the schedule information table. The third terminal processing unit 41 outputs the data transmitted from the wireless terminal 4 to the terminal communication unit 40 in the third slot allocated to the signal of the third wireless scheme in the third wireless scheme schedule information.

Figure 4:
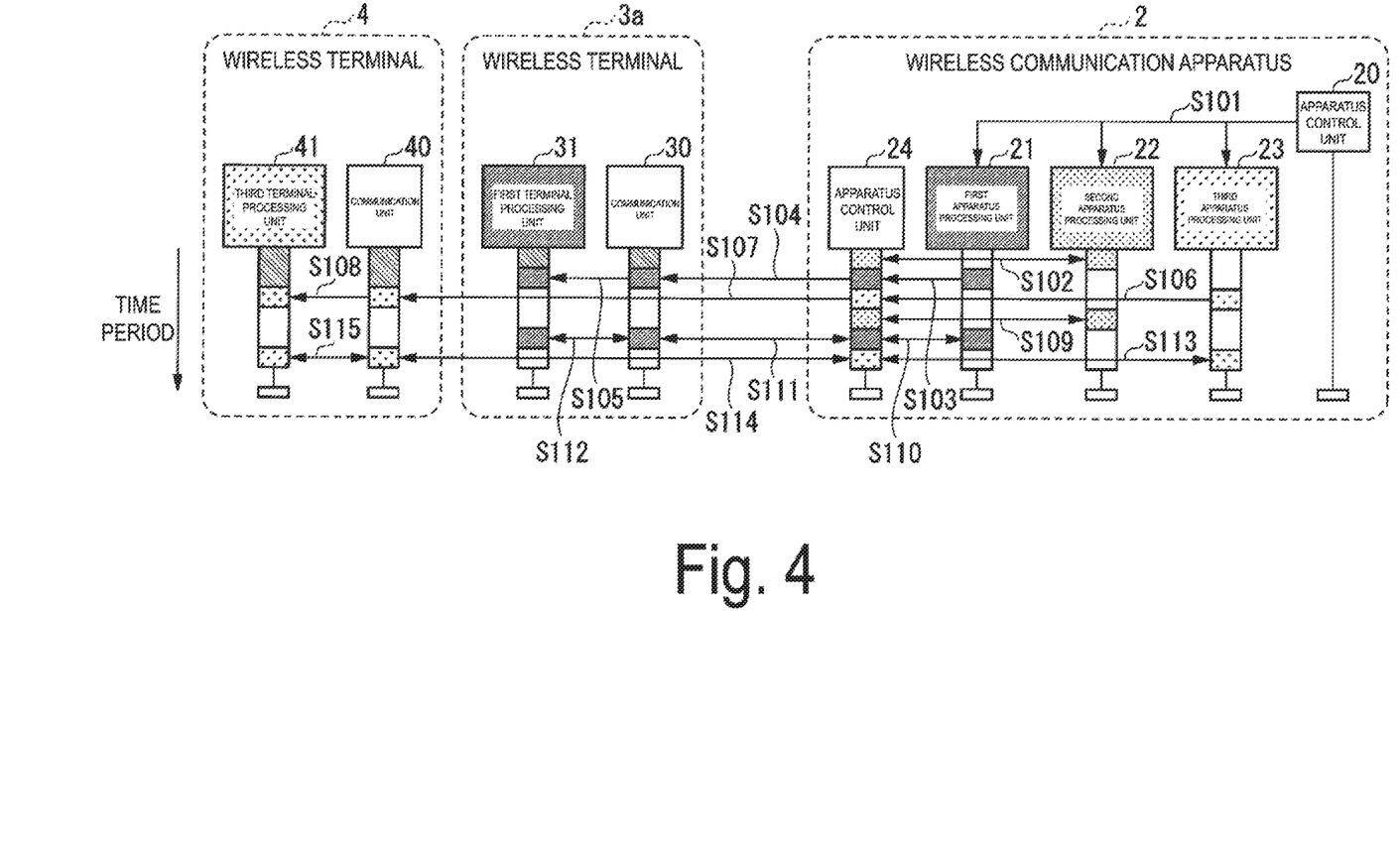
FIG. 4 is a flowchart illustrating an example of operations performed by the wireless communication system according to the first embodiment.

Next, an example of the operations of the wireless communication system 1a will be described in conjunction with FIG. 4.

The apparatus control unit 20 notifies each apparatus processing unit of schedule information related to the wireless scheme (step S101). The second apparatus processing unit 22 outputs the second wireless scheme schedule information to the apparatus communication unit 24 in the first slot allocated to the second wireless scheme in the schedule information table (step S102).

The first apparatus processing unit 21 outputs the first wireless scheme schedule information to the apparatus communication unit 24 in the second slot allocated to the signal of the first wireless scheme in the schedule information table (step S103). The apparatus communication unit 24 transmits a wireless signal such as a beacon signal and the like to the wireless terminal 3a in the second slot allocated to the signal of the first wireless scheme (step S104). The terminal communication unit 30 outputs the first wireless scheme schedule information to the first terminal processing unit 31 (step S105).

The third apparatus processing unit 23 outputs the third wireless scheme schedule information to the apparatus communication unit 24 in the third slot allocated to the signal of the third wireless scheme in the schedule information table (step S106). The apparatus communication unit 24 transmits a wireless signal such as a beacon signal and the like to the wireless terminal 3a in the third slot allocated to the signal of the third wireless scheme (step S107). The terminal communication unit 40 outputs the third wireless scheme schedule information to the third terminal processing unit 41 (step S108).

The second apparatus processing unit 22 and the apparatus communication unit 24 execute the signal processing of the second wireless scheme in the first slot allocated to the signal of the second wireless scheme in the schedule information table (step S109).

The first apparatus processing unit 21 outputs the data transmitted in the second slot allocated to the signal of the first wireless scheme in the schedule information table to the apparatus communication unit 24 (step S110). The apparatus communication unit 24 transmits the wireless signal including the data acquired from the first apparatus processing unit 21 to the wireless terminal 3a in the second slot allocated to the signal of the first wireless scheme (step S111). The terminal communication unit 30 outputs the data acquired from the received wireless signal to the first terminal processing unit 31 (step S112).

The third apparatus processing unit 23 outputs the data transmitted in the third slot allocated to the signal of the third wireless scheme in the schedule information table to the apparatus communication unit 24 (Step S113). The apparatus communication unit 24 transmits the wireless signal including the data acquired from the third apparatus processing unit 23 to the wireless terminal 4 in the third slot allocated to the signal of the third wireless scheme (step S114). The terminal communication unit 40 outputs the data acquired from the received wireless signal to the third terminal processing unit 41 (step S115).

As described above, the wireless communication system 1a according to the first embodiment includes a wireless communication apparatus 2 and one or more wireless terminals. The wireless communication apparatus 2 includes an apparatus control unit 20, a first apparatus processing unit 21, and an apparatus communication unit 24. The wireless terminal 3a includes a terminal communication unit 30 and a first terminal processing unit 31. The apparatus control unit 20 generates first wireless scheme schedule information. The first apparatus processing unit generates a downlink signal transmitted in the second slot to the wireless terminal 3a, based on the first wireless scheme schedule information. The apparatus communication unit 24 transmits, in the second slot, a beacon signal including the first wireless scheme schedule information. The terminal communication unit 30 receives the beacon signal in the second slot. The terminal communication unit 30 acquires the first wireless scheme schedule information from the beacon signal. The first terminal processing unit 31 generates an uplink signal transmitted in the second slot to the wireless communication apparatus 2, based on the first wireless scheme schedule information.

Thus, the wireless communication system 1a according to the first embodiment can reduce unnecessary wireless communication.

The wireless communication system 1a can make each wireless terminal correspond to a time share of a plurality of wireless schemes by using a beacon signal. The wireless communication system 1a allows an IoT operator to start an IoT service quickly and at low cost by virtualizing wireless access. The wireless communication system 1a can reduce the cost of the wireless terminal of a customer and the operating cost such as a charging cost. The wireless communication system 1a can reduce the number of signal transmissions to "1/(the number of wireless schemes used in the base station apparatus)" as compared with the method of the related art.

The wireless communication system 1a can reduce power consumption. The wireless communication system 1a can prevent generation of unnecessary radio waves. A wireless terminal can transmit and receive signals at appropriate timing even when executing wireless communication with a base station apparatus of which a wireless scheme to be used changes with time. The wireless communication system 1*a* can use wireless resources efficiently.

Second Embodiment

A second embodiment differs from the first embodiment in that one wireless terminal executes communication by using a plurality of wireless schemes. In the second embodiment, differences from the first embodiment will be described.

Figure 5:
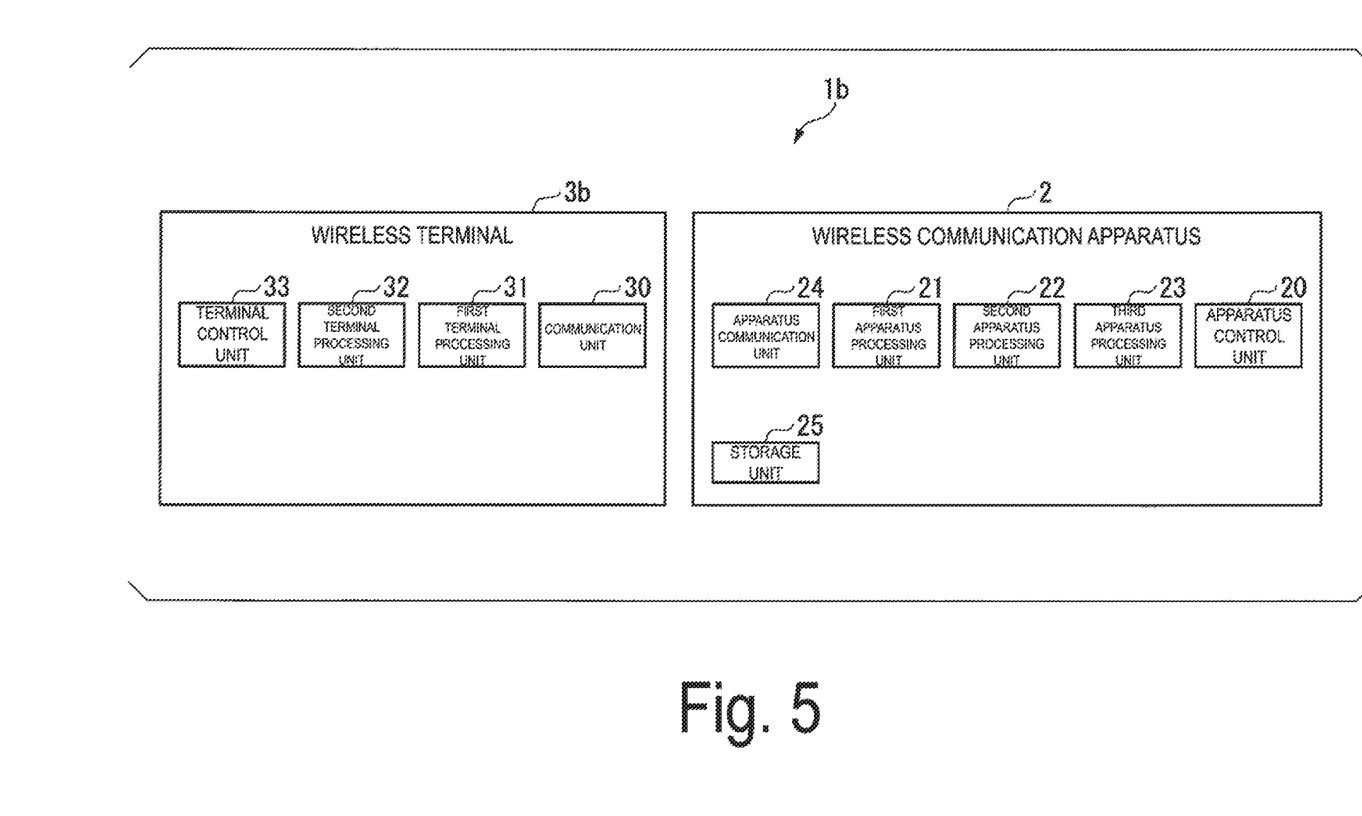
FIG. 5 is a diagram illustrating an example of a configuration of a wireless communication system according to a second embodiment.

FIG. 5 is a diagram illustrating an example of a configuration of a wireless communication system 1*b*. The wireless communication system 1*b* includes a wireless communication apparatus 2 and one or more wireless terminals 3*b*. The wireless communication system 1*b* is a system that executes communication of a plurality of wireless schemes. The wireless terminal 3*b* is a terminal that executes wireless communication with the wireless communication apparatus 2 by using two types of wireless scheme among a plurality of wireless schemes supported by the wireless communication apparatus 2. The wireless terminal 3*b* is, for example, a smartphone terminal, a tablet terminal, or an IoT device.

Hereinafter, the control information used for the communication of the first wireless scheme is referred to as "first wireless scheme control information". The first wireless scheme control information includes, for example, first wireless scheme schedule information. Hereinafter, the control information used for the communication of the second wireless scheme is referred to as "second wireless scheme control information". The second wireless scheme control information includes, for example, second wireless scheme schedule information.

Next, the configuration of the wireless communication apparatus 2 will be described. The apparatus control unit 20 notifies the first apparatus processing unit 21 of the first wireless scheme schedule information and the second wireless scheme control information. The apparatus control unit 20 notifies the third apparatus processing unit 23 of the third wireless scheme schedule information.

The apparatus control unit 20 acquires information (hereinafter, referred to as "second wireless scheme request information") indicating that a start of communication by the second wireless scheme is requested via the apparatus communication unit 24 and the first apparatus processing unit 21. The second wireless scheme request information includes, for example, identification information of the wireless terminal and information related to authentication.

Upon acquiring the second wireless scheme request information, the apparatus control unit 20 allocates a signal of the second wireless scheme to any one of first to third slots in the schedule information table. If the second apparatus processing unit 22 has not been activated, the apparatus control unit 20 activates the second apparatus processing unit 22. The apparatus control unit 20 notifies the activated second apparatus processing unit 22 of the second wireless scheme schedule information. The apparatus control unit 20 outputs information indicating the approval of the connection using the second wireless scheme to the first apparatus processing unit 21 as a response to the second wireless scheme request information received from the wireless terminal 3*b*.

The first apparatus processing unit 21 outputs the first wireless scheme schedule information and the second wireless scheme control information to the apparatus communication unit 24. The first apparatus processing unit 21 acquires the second wireless scheme request information from the wireless terminal 3*b* via the apparatus communication unit 24. The first apparatus processing unit 21 outputs the second wireless scheme request information to the apparatus control unit 20. The first apparatus processing unit 21 outputs information indicating the approval of the connection using the second wireless scheme to the apparatus communication unit 24 as a response to the second wireless scheme request information acquired from the apparatus control unit 20.

The apparatus communication unit 24 transmits a beacon signal including the first wireless scheme schedule information and the second wireless scheme control information to the terminal communication unit 30. The apparatus communication unit 24 acquires the second wireless scheme request information from the first wireless scheme control information received from the wireless terminal 3*b*. The apparatus communication unit 24 outputs the second wireless scheme request information to the first apparatus processing unit 21.

The apparatus communication unit 24 acquires information indicating the approval of the connection using the second wireless scheme from the first apparatus processing unit 21. The apparatus communication unit 24 transmits information indicating the approval of the connection using the second wireless scheme as first wireless scheme control information to the terminal communication unit 30.

Next, the configuration of the wireless terminal 3*b* will be described.

The wireless terminal 3*b* includes a terminal communication unit 30, a first terminal processing unit 31, a second terminal processing unit 32, and a terminal control unit 33.

The terminal communication unit 30 receives a beacon signal including the first wireless scheme schedule information and the second wireless scheme control information from the apparatus communication unit 24 in the slot allocated to the signal of the first wireless scheme. The terminal communication unit 30 acquires the first wireless scheme schedule information and the second wireless scheme control information from the received beacon signal. The terminal communication unit 30 outputs the first wireless scheme schedule information and the second wireless scheme control information to the first terminal processing unit 31.

The terminal communication unit 30 acquires the second wireless scheme request information from the terminal control unit 33 via the first terminal processing unit 31. The terminal communication unit 30 transmits a wireless signal (uplink signal) including the second wireless scheme request information to the apparatus communication unit 24 as first wireless scheme control information. The terminal communication unit 30 outputs information indicating the approval of the connection using the second wireless scheme to the first terminal processing unit 31.

The first terminal processing unit 31 acquires the second wireless scheme schedule information from the terminal communication unit 30. The first terminal processing unit 31 outputs the second wireless scheme schedule information to the terminal control unit 33.

The first terminal processing unit 31 acquires information indicating the approval of the connection using the second wireless scheme from the terminal communication unit 30. The first terminal processing unit 31 outputs information indicating the approval of the connection using the second wireless scheme to the terminal control unit 33.

The second terminal processing unit 32 is a processing unit that executes wireless signal processing of the second wireless scheme. The second terminal processing unit 32 acquires the second wireless scheme schedule information from the terminal control unit 33. The second terminal processing unit 32 executes the wireless signal processing of the second wireless scheme based on the second wireless scheme schedule information. That is, the second terminal processing unit 32 outputs the data transmitted from the wireless terminal 3b to the terminal communication unit 30 in the slot allocated the signal of the second wireless scheme in the second wireless scheme schedule information.

The terminal control unit 33 controls the operation of the first terminal processing unit 31 and the operation of the second terminal processing unit 32. For example, the terminal control unit 33 activates the second terminal processing unit 32. When activating the second terminal processing unit 32, the terminal control unit 33 may stop the operation of the first terminal processing unit 31. That is, when the second terminal processing unit 32 generates an uplink signal of the second wireless scheme, the terminal control unit 33 stops the operation of generating an uplink signal of the first wireless scheme by the first terminal processing unit 31.

The terminal control unit 33 acquires the second wireless scheme control information from the wireless communication apparatus 2 via the terminal communication unit 30 and the first terminal processing unit 31. Upon acquiring the second wireless scheme control information, the terminal control unit 33 generates second wireless scheme request information. The terminal control unit 33 outputs the generated second wireless scheme request information to the first terminal processing unit 31. The terminal control unit 33 records the second wireless scheme schedule information included in the second wireless scheme control information in the storage unit of the terminal control unit 33 as a time table. The terminal control unit 33 notifies the second terminal processing unit 32 of the second wireless scheme schedule information.

Figure 6:
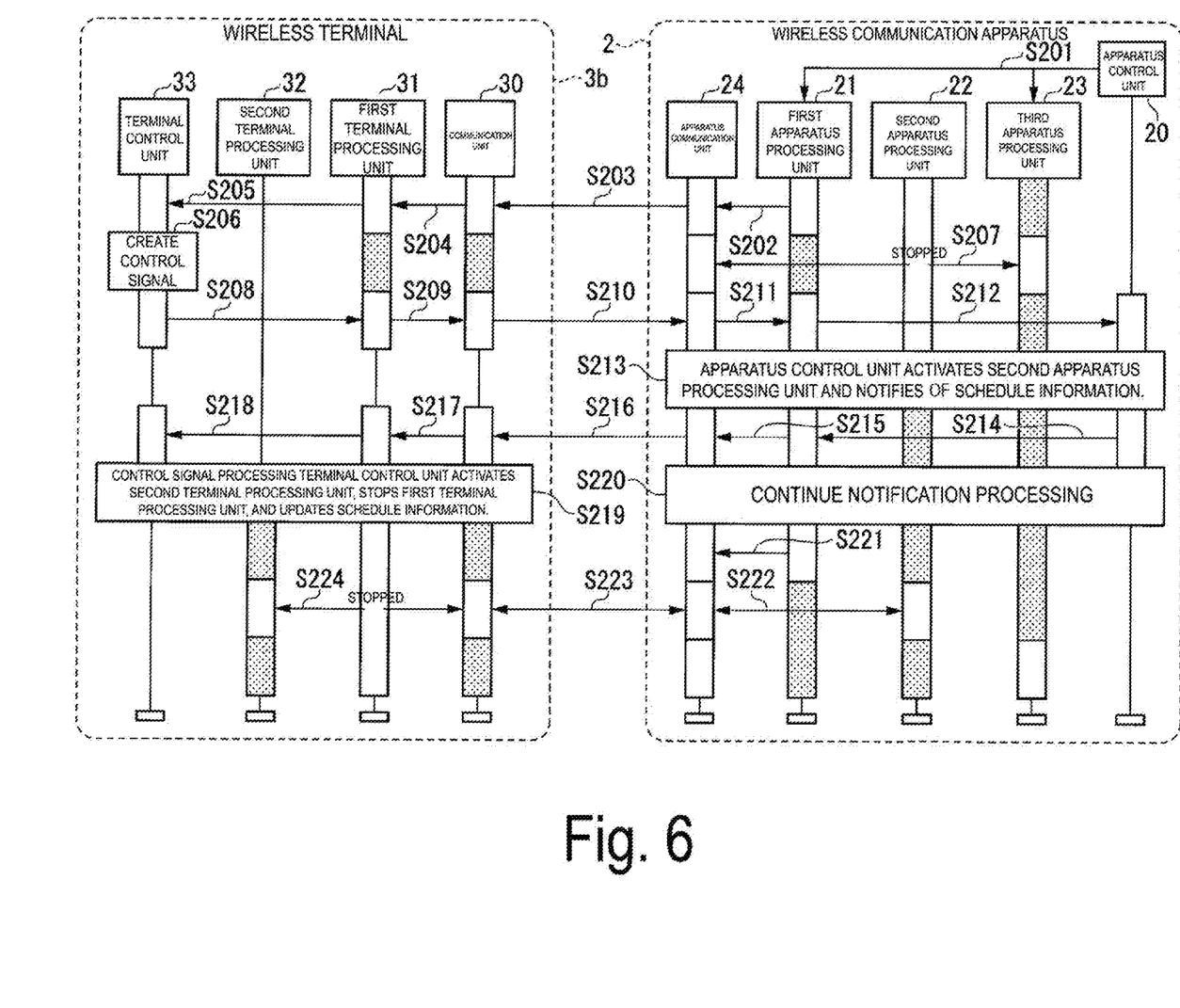
FIG. 6 is a flowchart illustrating an example of operations performed by the wireless communication system according to the second embodiment.

Next, an example of the operations of the wireless communication system 1b will be described.

FIG. 6 is a flowchart illustrating an example of the operations of the wireless communication system 1b. In the initial state in FIG. 6, the operation of the second apparatus processing unit 22 and the operation of the second terminal processing unit 32 are both stopped. The apparatus control unit 20 notifies the first apparatus processing unit 21 of the first wireless scheme schedule information and the second wireless scheme control information including the second wireless scheme schedule information. The apparatus control unit 20 notifies the third apparatus processing unit 23 of the third wireless scheme schedule information (step S201).

The first apparatus processing unit 21 outputs the first wireless scheme schedule information and the second wireless scheme control information to the apparatus communication unit 24 (step S202). The apparatus communication unit 24 transmits a beacon signal including the first wireless scheme schedule information and the second wireless scheme control information to the terminal communication unit 30 (step S203).

The terminal communication unit 30 acquires the first wireless scheme schedule information and the second wireless scheme control information from the received beacon signal. The terminal communication unit 30 outputs the first wireless scheme schedule information and the second wireless scheme control information to the first terminal processing unit 31 (step S204). The first terminal processing unit 31 outputs the second wireless scheme control information to the terminal control unit 33 (step S205). Since the terminal control unit 33 has acquired the second wireless scheme control information, the terminal control unit 33 generates second wireless scheme request information (step S206).

In the wireless communication apparatus 2, the third apparatus processing unit 23 and the apparatus communication unit 24 execute the signal processing of a third wireless scheme based on the third wireless scheme schedule information (step S207).

The terminal control unit 33 outputs the second wireless scheme request information to the first terminal processing unit 31 (step S208). The first terminal processing unit 31 outputs the second wireless scheme request information to the terminal communication unit 30 (step S209). The terminal communication unit 30 transmits a wireless signal including the second wireless scheme request information to the apparatus communication unit 24 as first wireless scheme control information (step S210).

The apparatus communication unit 24 acquires the second wireless scheme request information from the received first wireless scheme control information (step S211). The first apparatus processing unit 21 outputs the second wireless scheme request information to the apparatus control unit 20 (Step S212).

The apparatus control unit 20 allocates a signal of the second wireless scheme to any one of the first to third slots in the schedule information table. The apparatus control unit 20 activates the second apparatus processing unit 22. The apparatus control unit 20 notifies the activated second apparatus processing unit 22 of the second wireless scheme schedule information. The second apparatus processing unit 22 records the information indicating the slot allocated to the signal of the second wireless scheme in the second wireless scheme schedule information in the state information table of the second wireless scheme (step S213).

The apparatus control unit 20 outputs information indicating the approval of the connection using the second wireless scheme to the first apparatus processing unit 21 as a response to the second wireless scheme request information (step S214). The first apparatus processing unit 21 outputs information indicating the approval of the connection using the second wireless scheme to the apparatus communication unit 24 as a response to the second wireless scheme request information (step S215). The apparatus communication unit 24 transmits the information indicating the approval of the connection using the second wireless scheme to the terminal communication unit 30 as the first wireless scheme control information (step S216).

The terminal communication unit 30 outputs information indicating the approval of the connection using the second wireless scheme to the first terminal processing unit 31 (step S217). The first terminal processing unit 31 outputs information indicating the approval of the connection using the second wireless scheme to the terminal control unit 33 (step S218).

The terminal control unit 33 activates the second terminal processing unit 32. The terminal control unit 33 stops the operation of the first terminal processing unit 31. The terminal control unit 33 records the second wireless scheme schedule information in the storage unit of the terminal control unit 33 as a time table. The terminal control unit 33 notifies the second terminal processing unit 32 of the second wireless scheme schedule information (step S219).

In the wireless communication apparatus 2, the first apparatus processing unit 21 and the third apparatus processing unit 23 continue the communication processing (step S220). The first apparatus processing unit 21 may execute wireless signal processing of the first wireless scheme (step S221).

The second apparatus processing unit 22 executes the wireless signal processing of the second wireless scheme based on the second wireless scheme schedule information (step S222). The apparatus communication unit 24 communicates with the terminal communication unit 30 in the slot allocated to the signal of the second wireless scheme (step S223). The second terminal processing unit 32 executes the wireless signal processing of the second wireless scheme based on the second wireless scheme schedule information (step S224).

As described above, the wireless communication system 1*b* according to the second embodiment includes a wireless communication apparatus 2 and one or more wireless terminals. The wireless communication apparatus 2 includes an apparatus control unit 20, a first apparatus processing unit 21, a second apparatus processing unit 22, and an apparatus communication unit 24. The wireless terminal 3*b* has a terminal communication unit 30, a first terminal processing unit 31, and a second terminal processing unit 32.

The apparatus control unit 20 generates first wireless scheme schedule information and second wireless scheme schedule information. The first apparatus processing unit 21 acquires the first wireless scheme schedule information. The first apparatus processing unit 21 generates a downlink signal of the first wireless scheme transmitted in the first slot to the wireless terminal 3*b*. The second apparatus processing unit 22 acquires the second wireless scheme schedule information. The second apparatus processing unit 22 generates a downlink signal of the second wireless scheme transmitted in the second slot to the wireless terminal. The apparatus communication unit 24 transmits, in the first slot, a beacon signal including the first wireless scheme schedule information and the second wireless scheme schedule information.

The terminal communication unit 30 receives the beacon signal in the first slot. The terminal communication unit 30 acquires the first wireless scheme schedule information and the second wireless scheme schedule information from the beacon signal. The first terminal processing unit 31 generates an uplink signal of the first wireless scheme transmitted in the first slot to the wireless terminal 3*b*, based on the first wireless scheme schedule information. The second terminal processing unit 32 generates an uplink signal of the second wireless scheme transmitted in the second slot to the wireless terminal, based on the second wireless scheme schedule information.

Thus, the wireless communication system 1*b* of the second embodiment can reduce unnecessary wireless communication even when the wireless terminal executes communication using a plurality of wireless schemes.

The embodiments of the present invention have been described above in detail with reference to the drawings. Specific configurations, however, are not limited to those embodiments, and include any design or the like within the scope not departing from the gist of the present invention.

REFERENCE SIGNS LIST

1*a*, 1*b* Wireless communication scheme
2 Wireless communication apparatus
3*a*, 3*b* Wireless terminal
4 Wireless terminal
20 Apparatus control unit
21 First apparatus processing unit
22 Second apparatus processing unit
23 Third apparatus processing unit
24 Apparatus communication unit
25 Storage unit
30 Terminal communication unit
31 First terminal processing unit
32 Second terminal processing unit
33 Terminal control unit
40 Terminal communication unit
41 Third terminal processing unit

The invention claimed is:

1. A wireless communication method executed by a wireless communication system including one or more wireless terminals and a wireless communication apparatus, the method comprising:

at the wireless communication apparatus
generating first wireless scheme schedule information, which is information related to a schedule of a first slot allocated to an uplink signal and a downlink signal of a first wireless scheme, and second wireless scheme schedule information, which is information related to a schedule of a second slot allocated to an uplink signal and a downlink signal of the second wireless scheme,
generating a downlink signal of the first wireless scheme transmitted in the first slot to the wireless terminal, based on the first wireless scheme schedule information,
generating a downlink signal of the second wireless scheme transmitted in the second slot to the wireless terminal, based on the second wireless scheme schedule information,
storing a first state information table for the first wireless scheme and a second state information table for the second wireless scheme,
the first state information table including the first wireless scheme schedule information including a first time slot cycle, information indicating a first time slot available for communication, and a first current time slot, and
the second state information table including the second wireless scheme schedule information including a second time slot cycle, information indicating a second time slot available for communication, and a second current time slot; and
transmitting, in the first slot, a beacon signal including the first wireless scheme schedule information and the second wireless scheme schedule information, and
at the wireless terminal
receiving the beacon signal, in the first slot, and acquiring the first wireless scheme schedule information and the second wireless scheme schedule information from the beacon signal,
generating an uplink signal of the first wireless scheme transmitted in the first slot to the wireless communication apparatus, based on the first wireless scheme schedule information, and
generating an uplink signal of the second wireless scheme transmitted in the second slot to the wireless communication apparatus, based on the second wireless scheme schedule information.

2. The wireless communication method according to claim 1, wherein
when a second apparatus processing unit configured to generate the downlink signal of the second wireless scheme is not activated, the wireless communication apparatus activates the second apparatus processing unit and notifies the second apparatus processing unit of the second wireless scheme schedule information.

3. The wireless communication method according to claim 1, wherein when generating an uplink signal of the second wireless scheme, the wireless terminal stops processing for generating an uplink signal of the first wireless scheme.

4. A wireless communication apparatus comprising:
a processor; and
a storage medium having computer program instructions stored thereon, when executed by the processor, perform to:
generate first wireless scheme schedule information, which is information related to a schedule of a first slot allocated to an uplink signal and a downlink signal of a first wireless scheme, and second wireless scheme schedule information, which is information related to a schedule of a second slot allocated to an uplink signal and a downlink signal of the second wireless scheme;
generate a downlink signal of the first wireless scheme transmitted in the first slot to the wireless terminal, based on the first wireless scheme schedule information;
generate a downlink signal of the second wireless scheme transmitted in the second slot to the wireless terminal, based on the second wireless scheme schedule information;
store a first state information table for the first wireless scheme and a second state information table for the second wireless scheme,
the first state information table including the first wireless scheme schedule information including a first time slot cycle, information indicating a first time slot available for communication, and a first current time slot, and
the second state information table including the second wireless scheme schedule information including a second time slot cycle, information indicating a second time slot available for communication, and a second current time slot; and
transmit, in the first slot, a beacon signal including the first wireless scheme schedule information and the second wireless scheme schedule information.

5. A wireless communication system comprising one or more wireless terminals and a wireless communication apparatus, wherein
the wireless communication apparatus includes
an apparatus control unit configured to generate first wireless scheme schedule information, which is information related to a schedule of a first slot allocated to an uplink signal and a downlink signal of a first wireless scheme, and second wireless scheme schedule information, which is information related to a schedule of a second slot allocated to an uplink signal and a downlink signal of the second wireless scheme,
a first apparatus processing unit configured to generate a downlink signal of the first wireless scheme transmitted in the first slot to the wireless terminal, based on the first wireless scheme schedule information and to store a first state information table for the first wireless scheme, the first state information table including the first wireless scheme schedule information including a first time slot cycle, information indicating a first time slot available for communication, and a first current time slot,
a second apparatus processing unit configured to generate a downlink signal of the second wireless scheme transmitted in the second slot to the wireless terminal, based on the second wireless scheme schedule information and to store a second state information table for the second wireless scheme, the second state information table including the second wireless scheme schedule information including a second time slot cycle, information indicating a second time slot available for communication, and a second current time slot, and
an apparatus communication unit configured to transmit, in the first slot, a beacon signal including the first wireless scheme schedule information and the second wireless scheme schedule information, and
the wireless terminal includes
a terminal communication unit configured to receive the beacon signal, in the first slot, and acquire the first wireless scheme schedule information and the second wireless scheme schedule information from the beacon signal,
a first terminal processing unit configured to generate an uplink signal of the first wireless scheme transmitted in the first slot to the wireless communication apparatus, based on the first wireless scheme schedule information, and
a second terminal processing unit configured to generate an uplink signal of the second wireless scheme transmitted in the second slot to the wireless communication apparatus, based on the second wireless scheme schedule information.

6. The wireless communication system according to claim 5, wherein
the wireless communication apparatus further includes an apparatus control unit configured to activate the second apparatus processing unit, when the second apparatus processing unit is not activated, and notify the second apparatus processing unit of the second wireless scheme schedule information.

7. The wireless communication system according to claim 5, wherein when generating an uplink signal of the second wireless scheme, the first terminal processing unit stops processing of generating an uplink signal of the first wireless scheme.

* * * * *